US009973563B2

(12) United States Patent
Noguchi

(10) Patent No.: US 9,973,563 B2
(45) Date of Patent: *May 15, 2018

(54) IMPLEMENTING A JAVA METHOD

(71) Applicant: International Business Machines Corporation, Armonk, NY (US)

(72) Inventor: Atsushi Noguchi, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/485,305

(22) Filed: Apr. 12, 2017

(65) Prior Publication Data
US 2017/0223086 A1 Aug. 3, 2017

Related U.S. Application Data

(63) Continuation of application No. 13/567,182, filed on Aug. 6, 2012, now Pat. No. 9,678,814.

(30) Foreign Application Priority Data

Oct. 4, 2011 (JP) .................. 2011-220517

(51) Int. Cl.
*G06F 15/16* (2006.01)
*H04L 29/08* (2006.01)
(Continued)

(52) U.S. Cl.
CPC ........... *H04L 67/02* (2013.01); *G06F 9/5072* (2013.01); *H04L 67/34* (2013.01); *H04L 67/42* (2013.01)

(58) Field of Classification Search
CPC ............... G06F 9/5072; H04L 67/02
(Continued)

(56) References Cited

U.S. PATENT DOCUMENTS 5,944,791 A   8/1999  Scherpbier
6,014,702 A   1/2000  King et al.
(Continued)

FOREIGN PATENT DOCUMENTS

JP   5089217    4/1993
JP   H0749936   2/1995
(Continued)

OTHER PUBLICATIONS

Sue et al.; WebSphere Application Server: Feature Pack for Web 2.0; Web Messaging; SWG WebSphere, Apr. 2008; Web 2.0 Feature Pack for WAs WorkShop, IBM, 2008, 40 pages. English Translation (Abstract Only); 2 pages; URL:http://download.boulder.ibm.com/ibmdl/pub/software/dw/jp/websphere/was/vas_web20fep_ws/FPWEB20_06WebMessaging.pdf; May 21, 2008.

(Continued)

*Primary Examiner* — Andrew Georgandellis
(74) *Attorney, Agent, or Firm* — Schmeiser, Olsen & Watts, LLP; John Pivnichny

(57) ABSTRACT

A process and system for implementing a Java method. A browser in a second computer downloads, from a first computer, a web page having embedded therein a JavaScript and a Java applet. The second computer includes a Java Virtual Machine (JVM) communicatively coupled to the browser. After downloading the web page, the JavaScript receives from a Java servlet executing on the first computer a first message instructing the Java applet to execute the Java method. After receiving the first message, the Java applet executes the Java method. Executing the Java method includes the web browser executing the JavaScript which triggers execution of the Java applet by the JVM to cause executing the Java method by the Java applet. After executing the Java method, the JavaScript transmits to the Java (Continued)

servlet a second message that includes the Java method and a result of executing the Java method.

20 Claims, 9 Drawing Sheets

(51) Int. Cl.
*H04L 29/06* (2006.01)
*G06F 9/50* (2006.01)

(58) Field of Classification Search
USPC .................................................... 709/201
See application file for complete search history.

(56) References Cited

U.S. PATENT DOCUMENTS

| | | | |
|---|---|---|---|
| 6,230,171 | B1 | 5/2001 | Pacifici et al. |
| 6,405,367 | B1 | 6/2002 | Bryant et al. |
| 6,571,389 | B1 | 5/2003 | Spyker et al. |
| 6,950,852 | B1 | 9/2005 | Kobayaghi et al. |
| 7,225,225 | B2 | 5/2007 | Kuki et al. |
| 7,243,356 | B1 | 7/2007 | Saulpaugh et al. |
| 8,019,871 | B2 | 9/2011 | Milojicic |
| 8,135,841 | B2 | 3/2012 | Bozak et al. |
| 8,499,023 | B1* | 7/2013 | Harris ............... G06F 9/5072 709/201 |
| 2001/0037365 | A1 | 11/2001 | Montague et al. |
| 2002/0107999 | A1 | 8/2002 | Zimmermann et al. |
| 2002/0138624 | A1 | 9/2002 | Esenther |
| 2002/0143859 | A1 | 10/2002 | Kuki et al. |
| 2003/0041109 | A1 | 2/2003 | Meloni et al. |
| 2003/0105819 | A1 | 6/2003 | Kim et al. |
| 2004/0098447 | A1* | 5/2004 | Verbeke ............. G06F 9/5055 709/201 |
| 2005/0033656 | A1 | 2/2005 | Wang et al. |
| 2005/0055448 | A1 | 3/2005 | Kim |
| 2005/0108330 | A1 | 5/2005 | Sakaguchi |
| 2005/0198162 | A1 | 9/2005 | Bauer et al. |
| 2005/0219665 | A1 | 10/2005 | Mino |
| 2006/0129642 | A1 | 6/2006 | Qian et al. |
| 2009/0164581 | A1 | 6/2009 | Bove et al. |
| 2009/0254998 | A1* | 10/2009 | Wilson ............... G06F 9/5027 726/27 |
| 2010/0192071 | A1 | 7/2010 | Noguchi |
| 2010/0306642 | A1 | 12/2010 | Lowet et al. |
| 2011/0191431 | A1 | 8/2011 | Noguchi |
| 2012/0054842 | A1* | 3/2012 | Urios Rodriguez .... G06F 21/32 726/6 |
| 2013/0086138 | A1 | 4/2013 | Noguchi |

FOREIGN PATENT DOCUMENTS

| | | |
|---|---|---|
| JP | H09114788 | 5/1997 |
| JP | 10124461 | 5/1998 |
| JP | 20000112862 | 4/2000 |
| JP | 2000137683 | 5/2000 |
| JP | 2000194661 | 7/2000 |
| JP | 2001282561 | 10/2001 |
| JP | 2002063124 | 2/2002 |
| JP | 2002328886 | 11/2002 |
| JP | 2003150440 | 5/2003 |
| JP | 2004213280 | 7/2004 |
| JP | 2004265063 | 9/2004 |
| JP | 2005018499 | 1/2005 |
| JP | 2005285107 | 10/2005 |
| JP | 2006202228 | 8/2006 |
| JP | 2007034687 | 2/2007 |
| JP | 2007079988 | 3/2007 |
| JP | 2007293885 | 11/2007 |
| JP | 2009053957 | 3/2009 |
| JP | 2010092103 | 4/2010 |
| JP | 2010097543 | 4/2010 |
| JP | 2011048605 | 3/2011 |

OTHER PUBLICATIONS

Unbeatable JavaScript Tools—The Dojo Toolkit [online]; 1 page; [retrieved on Nov. 19, 2010]. Retrieved from the Internet: <URL: http://dojotoolkit.org/>.
WebSphere Application Server Feature Pack for Web 2.0, Dojo. 62 pages. <URL: http://www-06.ibm.com/jp/software/websphere/developer/was/wv61/feature_pack/web20?ws/pdf/FPWEB20.02Dojo.pdf.
Anonymous; Method of Synchronizing Multiple Applets; IP.com PriorArtDatabase Technical Disclosure; IPCOM000206786D; May 9, 2011.
Wikipedia; Sorting algorithm [online]; Jun. 7, 2012 [retrieved on Jun. 12, 2012]. Retrieved from the Internet: <URL: http://en.wikipedia.org/wiki/Sorting_algorithm; 8 pages.
Wikipedia; Divide and conquer algorithm [online]; May 20, 2012 [retrieved on Jun. 12, 2012]. Retrieved from the Internet: <URL: http://en.wikipedia.org/wiki/Divide_and_conquer_algorithm; 5 pages.
U.S. Appl. No. 12/983,346, filed Jan. 3, 2011; Confirmation No. 1178.
Office Action (dated Mar. 13, 2012) for U.S. Appl. No. 12/694,424, filed Jan. 27, 2010; Confirmation No. 5995.
Amendment filed Jun. 8, 2012 in response to Office Action (dated Mar. 13, 2012) for U.S. Appl. No. 12/694,424, filed Jan. 27, 2010; Confirmation No. 5995.
JPO Office Action dated Jul. 2013, 2 pages.
Notice of Allowance dated Oct. 9, 2013 for U.S. Appl. No. 12/983,346, filed Jan. 3, 2011, First Named Inventor Atushi Noguchi, Confirmation No. 1178.
Office Action (dated Oct. 25, 2013) for U.S. Appl. No. 12/694,424, filed Jan. 27, 2010, First Named Inventor Atsushi Noguchi, Confirmation No. 5995.
Final Office Action (dated Nov. 28, 2012) for U.S. Appl. No. 12/694,424, filed Jan. 27, 2010, First Named Inventor Atsushi Noguchi, Confirmation No. 5995.
U.S. Appl. No. 14/147,643, filed Jan. 6, 2014, First Named Inventor Atsushi Noguchi, Conf. No. 7950.
Notice of Allowance (dated Jan. 21, 2014) U.S. Appl. No. 12/983,346, filed Jan. 3, 2011, First Named Inventor Atsushi Noguchi, Conf. No. 1178.
Date of JPO Office Action dated Mar. 18, 2014, IDS, 2 pages.
Date of JPO Office Action dated Apr. 21, 2015, IDS, 3 pages.
Office action (dated Sep. 21, 2015) for U.S. Appl. No. 14/147,643, filed Jan. 6, 2014, Conf. No. 7950.
Amendment (dated Dec. 21, 2015) for U.S. Appl. No. 14/147,643, filed Jan. 6, 2014, Conf. No. 7950.
Notice of Allowance (dated Jul. 31, 2016); U.S. Appl. No. 15/096,833, filed Apr. 12, 2016.
Office Action (dated Feb. 13, 2015), U.S. Appl. No. 13/567,182, filed Aug. 6, 2012.
Amendment (dated May 13, 2015), U.S. Appl. No. 13/567,182, filed Aug. 6, 2012.
Final Office Action (dated Aug. 21, 2015), U.S. Appl. No. 13/567,182, filed Aug. 6, 2012.
Final Amendment (dated Oct. 21, 2015), U.S. Appl. No. 13/567,182, filed Aug. 6, 2012.
Office Action (dated Apr. 22, 2016), U.S. Appl. No. 13/567,182, filed Aug. 6, 2012.
Amendment (dated Jul. 22, 2016), U.S. Appl. No. 13/567,182, filed Aug. 6, 2012.
Notice of Allowance (dated Feb. 9, 2017), U.S. Appl. No. 13/567,182, filed Aug. 6, 2012.

* cited by examiner

```
package com.nogu;
import java.io.Serializable;

public class Calculator implements Serializable { protected int a=0;
    protected int b=0;
    protected int result=0;

public void add(){
        result = a + b;
    } public void subtract(){
        result = a - b;
    } public void multiply(){
        result = a * b;
    } public void divide(){
        result = a / b;
    } public void setParams(int x, int y){
        a = x;
        b = y;
    } public int getResult(){
        return result;
    }
}
```

FIG. 5

(A)
```
import netscape.javascript.JSObject;
public void calljs(String str){
        JSObject window = JSObject.getWindow(this);
        String ss = "doAlert(\'" + str + "\')";
        window.eval(ss);
}
```

(B)
```
function fillTa(str)
{
        var txt = str;
        ti.setStr(txt);
}
```

FIG. 6

IMPLEMENTING A JAVA METHOD

This application is a continuation application claiming priority to Ser. No. 13/567,182 filed Aug. 6, 2012.

TECHNICAL FIELD

The present invention relates to a system, computer, method and program for calling a Java® method on a client.

BACKGROUND

There is known a function of notifying a web browser of an event in real time. There is also known a client program that updates display screens of web browsers on a plurality of terminals in synchronization with each other.

BRIEF SUMMARY

The present invention provides a process for implementing a Java method by a second computer for a first computer to which the second computer is connected via a communication line, said process comprising:

said second computer receiving from the first computer a first message instructing the second computer to execute a Java method that is included in the first message, said Java method comprising source code;

after said receiving the first message, said second computer executing the Java method that is in the first message; and after said executing the Java method, said second computer transmitting to the first computer a second message that comprises the Java method and a result of said executing the Java method.

The present invention provides a computer program product, comprising a computer readable tangible storage device having computer readable program code stored therein, said program code configured to be executed by a second computer to implement a process for implementing a Java method by the second computer for a first computer to which the second computer is connected via a communication line, said process comprising:

said second computer receiving from the first computer a first message instructing the second computer to execute a Java method that is included in the first message, said Java method comprising source code;

after said receiving the first message, said second computer executing the Java method that is in the first message; and after said executing the Java method, said second computer transmitting to the first computer a second message that comprises the Java method and a result of said executing the Java method.

The present invention provides a computer system comprising a processor of a second computer, a memory, and a computer readable storage device, said storage device containing program code configured to be executed by the processor via the memory to implement a process for implementing a Java method by the second computer for a first computer to which the second computer is connected via a communication line, said process comprising:

said second computer receiving from the first computer a first message instructing the second computer to execute a Java method that is included in the first message, said Java method comprising source code;

after said receiving the first message, said second computer executing the Java method that is in the first message; and after said executing the Java method, said second computer transmitting to the first computer a second message that comprises the Java method and a result of said executing the Java method.

BRIEF DESCRIPTION OF THE DRAWINGS

FIG. 5 shows a sample source of a Java class performing the four rules of arithmetic FIG. 6 shows sample sources illustrating ways of transmitting a message between a JavaScript and an applet, in accordance with embodiments of the present invention.

DETAILED DESCRIPTION

Figure 1:
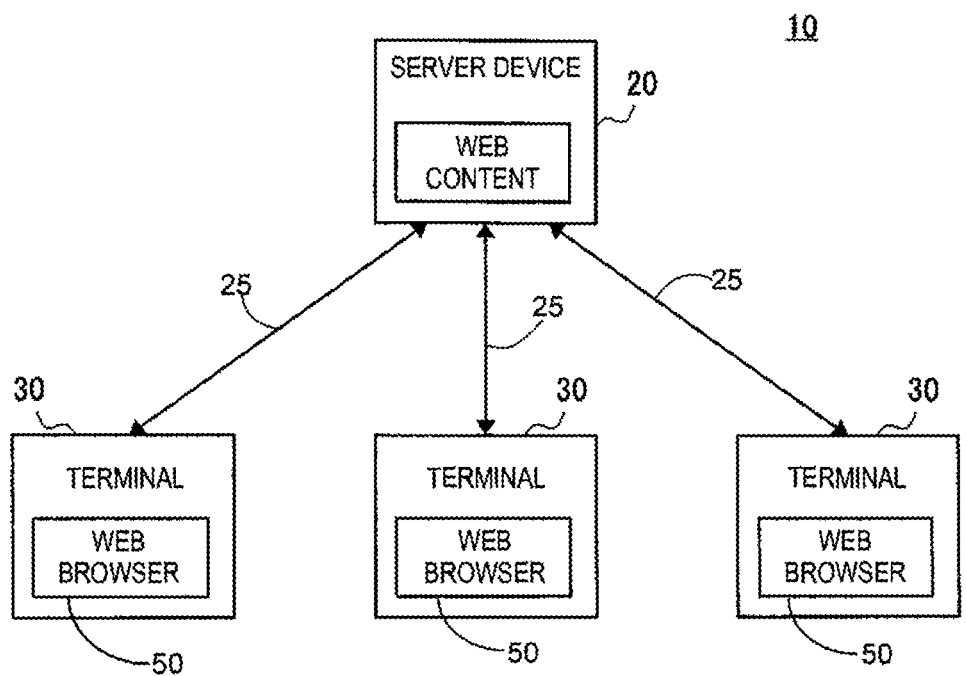
FIG. 1 is a diagram showing a configuration of a computer system, in accordance with embodiments of the present invention.

A RMI (Remote Method Invocation) mechanism is used in order to call, from a certain Java Virtual Machine (JVM), a method of an object existing in another JVM. In order to use the RMI, a module which accepts a call of an RMI service first is operating in advance at the side the Java method is called.

Grid computing is a system capable of causing a client to perform calculation processing from a server. The grid computing combines computers on a network to cause the computers to function as one complex computer system. However, the present invention prepares a dedicated client to use the grid computing.

The present invention makes it possible to call, from a Java program on a server or a web browser on a client, a Java method on another client in a simpler method. The present invention makes it possible to, even if a dedicated module is not prepared on a client, call a Java method on the client from a server.

According to a first aspect of the present invention, there is provided a computer system in which a server computer and a client computer are connected via a communication line; wherein the server computer comprises: a server-side message transmission section transmitting a message for calling a Java method executable by the server computer on a Java applet executed on the client computer, to the client computer; and a server-side message reception section receiving a message that includes a result of the client computer calling the Java method in response to the message transmitted by the server-side message transmission section, from the client computer; and the client computer comprises: a client-side message reception section receiving the message transmitted from the server computer; a script execution section executing a browser script on a web browser on the client computer; an applet execution section executing the Java applet on a Java Virtual Machine of the client computer; an event handing-over section controlling the applet execution section to call the Java method by handing over an event between the browser script executed by the script execution section and the Java applet executed by the applet execution section, in response to the message received by the client-side message reception section; and a client-side message transmission section transmitting a message that includes a result of the applet execution section calling the Java method, to the server computer.

According to a second aspect of the present invention, there is provided the system according to the first aspect in which said server-side message transmission section transmits a message including a Java object including the Java method executable by said server computer, to said client computer.

According to a third aspect of the present invention, there is provided the system according to the first aspect in which said server-side message transmission section transmits a message including a parameter for calling the Java method executable by said server computer held by said Java applet, to said client computer.

According to a fourth aspect of the present invention, there is provided the system according to any one of the first to third aspects in which the computer system comprises a plurality of client computers, said client-side message transmission section of a first client computer of the client computers transmits a message for calling said. Java method on the Java applet executed by a second client computer of the client computers, to the second client computer via said server computer, said applet execution section of the second client computer calls said Java method in response to said message received by said client-side message reception section of said second client computer, and said client-side message transmission section of said second client computer transmits a message including a result of calling of said Java method, to said first client computer via said server computer.

According to a fifth aspect of the present invention, there is provided the system according to any one of the first to fourth aspects in which in a case where the load on said server computer is greater than a predetermined criterion, said server-side message transmission section transmits the message for calling said Java method on said Java applet, to said client computer.

According to a sixth aspect of the present invention, there is provided the system according to any one of the first to fifth aspects in which said server-side message transmission section transmits a message for calling on the Java applet a Java method for controlling display on a display section for said client computer by said Java applet, to the client computer.

According to a seventh aspect of the present invention, there is provided a computer system in which a server computer and a client computer connected via a communication line, the server computer having a function of notifying the client computer of an event occurring in the server computer, wherein the server computer comprises: an application transmission section transmitting a browser script and a Java applet to the client computer that has accessed the URL of an HTML file of the server computer that includes the browser script and the Java applet; a server-side message transmission section transmitting a message that includes a Java method executable by the server computer and called on the Java applet executed on the client compute a message that includes a parameter for calling a Java method held by the Java applet, to the client computer; and a server-side message reception section receiving a message that includes a result of the client computer calling the Java method in response to the message transmitted by the server-side message transmission section, from the client computer; and the client computer comprises: an application reception section receiving the browser script and the Java applet from the server computer by accessing the URL of the HTML file of the server computer; a client-side message reception section receiving the message transmitted from the server computer; a script execution section executing the browser script received by the application reception section on a web browser on the client computer; an applet execution section executing the Java applet received by the application reception section on a Java Virtual Machine of the client computer; an event handing-over section controlling, in response to the message received by the client-side message reception section, the applet execution section to call the Java method included in the message or the Java method held by the Java applet by handing over an event between the browser script executed by the script execution section and the Java applet executed by the applet execution section; and a client-side message transmission section transmitting a message that includes a result of the applet execution section calling the Java method, to the server computer According to an eighth aspect of the present invention, there is provided a computer connected to a second computer via a communication line, the computer comprising: a message transmission section transmitting a message for calling a Java method executable by the computer on a Java applet executed on the second computer, to the second computer; and a message reception section receiving a message that includes a result of the second computer calling the Java method in response to the message transmitted by the message transmission section, from the second computer.

According to a ninth aspect of the present invention, there is provided a method for a first computer to call a Java method on a second computer connected to the first computer via a communication line, the method comprising the steps of: transmitting a message for calling a Java method executable by the first computer on a Java applet executed on the second computer, from the first computer to the second computer; receiving the message transmitted from the first computer by the second computer; executing a browser script on a web browser on the second computer; executing the Java applet on a Java Virtual Machine of the second computer; calling the Java method by the second computer by handing over an event between the browser script and the Java applet, in response to the received message; transmitting a message that includes a result of the Java method being called, from the second computer to the first computer; and receiving the message transmitted from the second computer by the first computer.

According to a tenth aspect of the present invention, there is provided a program causing a computer connected to a second computer via a communication line to function to call a Java method on the second computer, the program causing the computer to function as: a message transmission section transmitting a message for calling a Java method executable by the computer on a Java applet executed on the second computer, to the second computer; and a message reception section receiving a message that includes a result of the second computer calling the Java method in response to the message transmitted by the message transmission section, from the second computer.

FIG. 1 shows a configuration of a computer system 10, in accordance with embodiments of the present invention. The computer system 10 comprises a server device 20 and a plurality of terminals 30. The server device 20 is connected to each terminal line via a communication line 25. The server device 20 is a web application server and provides a web content to a web browser 50 on each terminal 30. For example, the server device 20 provides a web page as a hypertext markup language (HTML) file to each web browser 50.

Each of the plurality of terminals 30 is connected to the server device 20 via a network. Each terminal 30 executes its web browser 50. In response to an operation by a user, each web browser 50 acquires web content from the server device 20, executes the web content, and displays information provided by the web content. For example, each web browser downloads a web page comprising the web content and displays the web page on a display screen.

The web content includes a JavaScript® application and a Java applet (referred to simply as an applet hereinafter). The JavaScript application is a program described in a JavaScript language that can be executed by the web browser 50. The applet is a Java program embedded in a window of the web browser 50 and executed by the web browser 50. Each terminal 30 downloads and executes these applications. These applications are inserted in a web page that is an HTML file, for example. These applications are created by the provider of the web content, for example. The JavaScript application is an example of a script for a browser.

Figure 2:
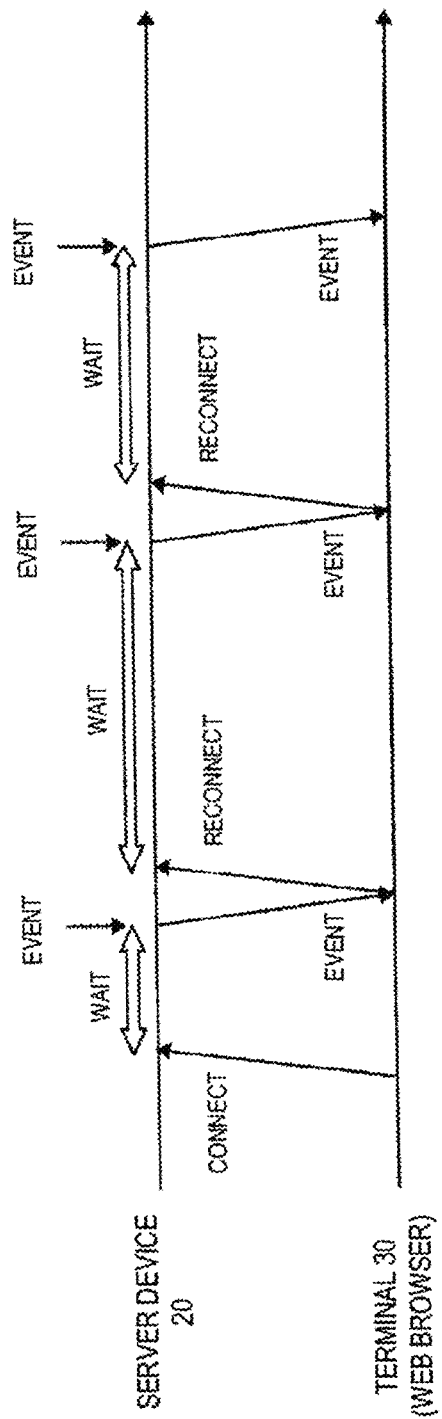
FIG. 2 is a diagram showing an example of a process in which a server device transmits an event to a terminal, in accordance with embodiments of the present invention.

FIG. 2 is a diagram showing an example of a process in which the server device 20 transmits an event to the terminal 30 according, in accordance with embodiments of the present invention. In an example, the computer system 10 transmits an event from the server device 20 to the terminal 30 in the method shown in FIG. 2.

Specifically, each of the plurality of web browsers transmits a request to the server device 20. The server device 20 does not immediately respond to the request received from the web browser but maintains the hypertext transfer protocol (HTTP) connection for a certain length of time (30 to 60 seconds, for example).

If an event occurs in the server device 20 during the certain length of time, the server device 20 sends a response including a message about the event back to the web browser. Upon receiving the response, the web browser immediately transmits the next request to the server device 20. On the other hand, if no event occurs in the server device 20 during the certain length of time, the server device 20 disconnects the HTTP connection after a lapse of the certain length of time. After that, the web browser connects to the server device 20 again. In this way, the server device 20 can notify each of the plurality of web browsers of the event occurring in the server device 20 without a time lag.

If the web browsers can establish not only the HTTP connection but also a TCP connection with the server device 20, the server device 20 can also notify the web browsers of an event without a time lag (that is, in real time) in a method other than that shown in FIG. 2, for example, by using a WebSocket technique.

Such functions are incorporated on the side of the client (the web browser on each terminal 30) in the form of a JavaScript library. On the other hand, a mainstream web application on the side of the server (the server device 20) is a servlet written in Java. The execution environment of the server is not ready for JavaScript, so that any processing on the server side is typically not written in JavaScript. Therefore, in order to achieve load distribution by making an ordinary client perform a calculation processing on the server side, it is desirable to make the server transmit an object written in Java, which is a language describing the application of the server side, as it is and to make the client process the object.

To this end, the server device 20 does not transmits a program that can be executed only on the terminal 30 (the web browser) to the terminal 30 but transmits a program (a Java class or Java object) that can be executed on the server device 20 to the terminal 30 as it is, and the program in the terminal 30 is externally called, such as by the server device 20. That is, the serve device 20 transmits a Java object to the terminal 30 and requests the terminal 30 to call the Java object. The terminal 30 sends the Java object including a result of the call back to the server device 20. In this way, the server device 20 makes the terminal 30 execute, as it is, the program that can be executed by the server device 20.

Figure 3:
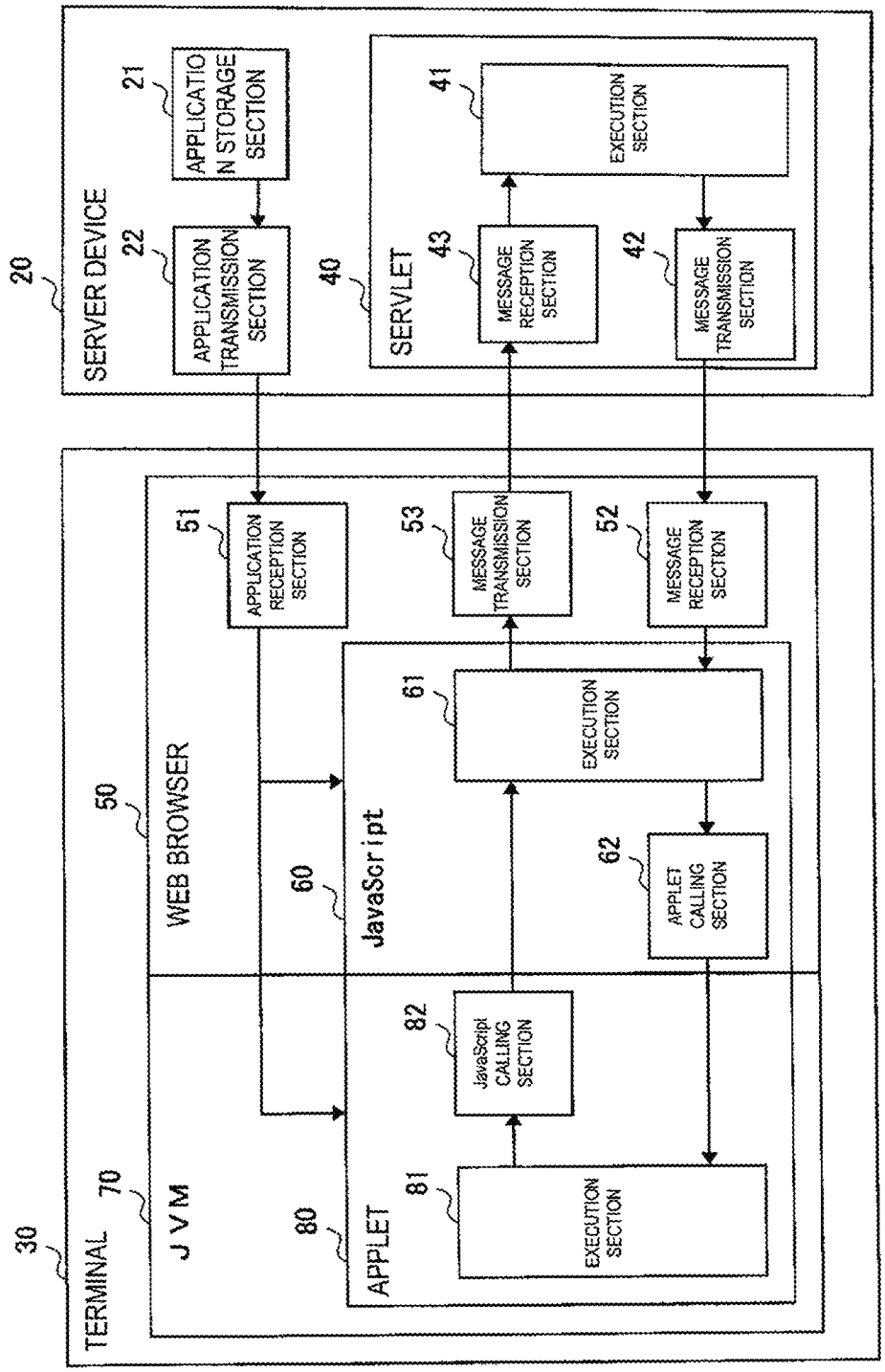
FIG. 3 is a block diagram showing a functional configuration of the server device and the terminal according to the embodiment of the present invention, in accordance with embodiments of the present invention.

FIG. 3 shows a functional configuration of the server device 20 and the terminal 30 according, in accordance with embodiments of the present invention. Functional blocks of the server device 20 will be first described. The server device 20 has an application storage section 21 and an application transmission section 22. The server device 20 executes a servlet 40.

The application storage section 21 stores web content of the server device 20. The web content includes a JavaScript application 60 (referred to simply as a JavaScript 60 hereinafter) and an applet 80 that are to he downloaded to and executed by the terminal 30.

In response to a request from a web browser running on each terminal 30, the application transmission section 22 transmits, to the terminal 30, the JavaScript 60 and the applet 80 stored in the application storage section 21.

The servlet 40 is a program described in the Java language. The server device 20 executes the servlet 40 to implement an execution section 41, a message transmission section 42 and a message reception section 43.

The execution section 41 performs a calculation processing of the servlet 40 or the like. A specific example of the processing will be described later. The execution section 41 also has a function of designating a terminal 30 to execute some Java methods. To this end, the execution section 41 exchanges a message with the terminal 30 via the message transmission section 42 and the message reception section 43 to make the terminal 30 call a Java method to be executed by the terminal 30.

The message transmission section 42 converts an event occurring in the servlet 40 into a message and transmits the message to the terminal 30. In particular, the message transmission section 42 transmits, to the terminal 30, a message for calling a Java method on the applet 80 executed on the terminal 30. The message transmission section 42 in this embodiment is an example of a server-side message transmission section.

The message reception section 43 receives, from the terminal 30, a message including the result of the terminal 30 calling the Java method in response to the message transmitted by the message transmission section 42. The message reception section 43 is an example of a server-side message reception section.

Next, functional blocks of the terminal 30 will be described. The terminal 30 has a web browser 50 and a Java virtual machine 70 (referred to simply as a JVM 70 hereinafter) communicatively coupled to the web browser 50.

The web browser 50 has an application reception section 51, a message reception section 52 and a message transmission section 53. The web browser 50 executes the JavaScript 60.

The application reception section 51 accesses the uniform resource locator (URL) of an HTML file on the server device 20 and receives, from the server device 20, the JavaScript 60 and the applet 80 to be executed by the web browser 50 and the JVM 70, respectively.

The message reception section 52 receives the message transmitted from the message transmission section 42 of the server device 20. The message reception section 52 in this embodiment is an example of a client-side message reception section.

The message transmission section 53 transmits, to the message reception section 43 of the server device 20, a message including the result of an execution section 81 (described later) of the applet 80 calling the Java method in response to the message received by message reception section 52. The message transmission section 53 in this embodiment is an example of a client-side message transmission section.

The JavaScript 60 is a program executed on the web browser 50. The web browser 50 executes the JavaScript 60 to implement an execution section 61 and an applet calling section 62. The execution section 61 performs a specific processing described in the JavaScript 60 received by the application reception section 51. The applet calling section 62 calls the execution section 81 of the applet 80 in response to the message received by the message reception section 52 notify the applet 80 of the event from the server device 20. The execution section 61 in this embodiment is an example of a script execution section.

The JVM 70 is software that transforms a Java byte code into a native code for a platform of the terminal 30 and executes the native code. The JVM 70 executes the applet 80.

The applet 80 is a Java program executed on the JVM 70. The JVM 70 executes the applet 80 to implement the execution section 81 and a JavaScript calling section 82. The execution section 81 performs a specific processing described in the applet 80 received by the application reception section 51. The JavaScript calling section 82 calls the execution section 61 of the JavaScript 60 to transmit an event occurring on the applet 80 to the server device 20 or the like.

As described above, the web browser 50 and the JVM 70 hand over an event to each other via the applet calling section 62 and the JavaScript calling section 82. The applet calling section 62 and the JavaScript calling section 82 in this embodiment are an example of an event handing-over section.

Figure 4:
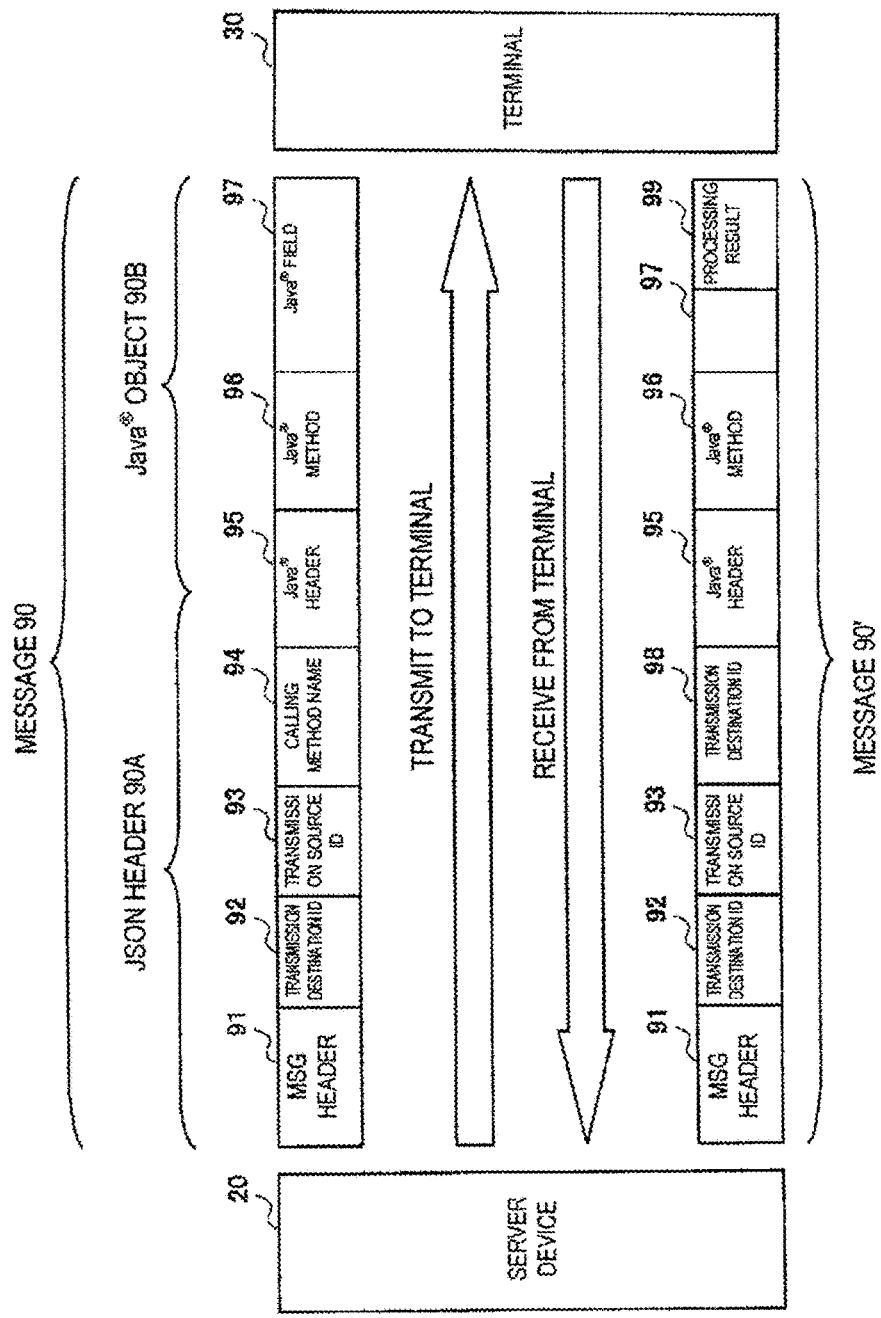
FIG. 4 is a diagram showing an example of a format of a message exchanged between the server device and the terminal, in accordance with embodiments of the present invention.

FIG. 4 shows an example of a format of a message exchanged between the server device 20 and the terminal 30, in accordance with embodiments of the present invention. The message is generated in a data format of JavaScript Object Notation (JSON), which is an application of the object notation in JavaScript. A message 90 transmitted from the server device 20 to the terminal 30 will be first described. The message 90 has a JSON header 90A and a Java object 90B.

The JSON header 90A includes an MSG header 91, a transmission destination ID 92, a transmission source ID 93, and a calling method name 94. The MSG header 91 is a header for transmission of the message 90. The transmission destination ID 92 is information for identifying the web browser on the terminal 30 that is the destination of the message 90. The transmission source ID 93 is information for identifying the server device 20 that is the transmission source. The calling method name 94 is the name of the Java method called by the Java object 90B.

The Java object 90B includes a Java header 95, Java method 96, and a Java field 97. The Java header 95 is a header of the Java object 90B. The Java method 96 is a section in which a "procedure" of the Java object 90B is described. The Java field 97 is "data" (parameter) for execution of the Java method 96.

Although a message 90' sent from the terminal 30 back to the server device 20 is similar to the message 90, what are specified as the transmission destination ID 92 and the transmission source ID 93 of the message 90' are what are specified as the transmission source ID 93 and the transmission destination ID 92 of the message 90, respectively. In addition, the message 90' includes a processing result code 98 instead of the calling method name 94 of the message 90. The processing result code 98 is a return code that assumes 0 when the Java object 90B is successfully executed and assumes −1 when the Java object 90B is erroneously executed, for example. The message 90' further includes a processing result 99 as a part of the Java field 97. The processing result 99 is a value such as a calculation result obtained by execution of the Java object 90B.

The server device 20 does not always have to transmit the Java object 90B to the terminal 30. The Java method called in the terminal 30 can be a method that the Java program such as the applet 80 in the terminal 30 originally has. Therefore, the message transmitted from the server device 20 to the terminal 30 may be a message including the Java method (that is, the Java object) that is executable by the server device 20 and is called on the applet 80 executed by the terminal 30 or a message including no Java object and including only a parameter for calling the Java method that the applet 80 already has.

A specific example of the Java method will be described. FIG. 5 shows a sample source of a Java class performing the four rules of arithmetic, in accordance with embodiments of the present invention. The Java method comprises source code. The Java class has the following functions (1) to (3). The class itself does not have an applet interface and therefore is not a Java applet.

(1) A function of calling a parameter setting method (setParams ( )) to set values in two input parameter fields "a" and "b".
(2) A function of calling a calculation method (any of add( ), subtract( ), multiply( ) and divide( )) to set a calculation result in a result field "result".
(3) A function of calling a result getting method (getResult( )) to obtain a calculation result from the result field "result".

In the computer system 10, the server device 20 can call the Java method executable by the server device 20 on the applet 80 executed by the terminal 30. In this process, a general-purpose Java class such as that shown in FIG. 5 is available from the applet 80 and is executed on the terminal 30. When the server device 20 uses the Java class shown in FIG. 5, all the functions (1) to (3) described above are performed by the server device 20, and the processing (2) is also performed by a resource (a CPU, a memory) of the server device 20. On the other hand, when the terminal 30 uses the Java class shown in FIG. 5, the function (1) described above can be performed by the server device 20, the function (2) described above can be performed by the terminal 30 using a resource of the terminal 30, and the function (3) can be performed by the server device 20, for example.

That is, according to this embodiment, any of the server device 20 and the terminal 30 can perform the main calculation processing (2). Therefore, depending on the load status of the server device 20 at the present point in time, the terminal 30 can take over the responsibility of processing the program (the Java class and the instance thereof) having been executed by the server device 20 until the present point in time. For example, the server device 20 can execute the Java program while the load on the server device 20 is lower than a predetermined criterion, and can transmits, to the terminal 30, a message to call a Java method that is a part of the program on the applet 80 when the load exceeds the criterion.

The Java class that performs the four rules of arithmetic shown in FIG. 5 is an example highly simplified for illustration. The logic and parameters of the calculation processing can be more complicated.

Next, specific methods for the applet calling section 62 to call the execution section 81 of the applet 80 and for the JavaScript calling section 82 to call the execution section 61 of the JavaScript 60 will be described. FIG. 6 shows sample sources illustrating ways of transmitting a message between the JavaScript 60 and the applet 80, in accordance with embodiments of the present invention. FIG. 6(A) shows an example of a way of transmitting a message from the applet to the JavaScript, and FIG. 6(B) shows an example of a way of transmitting a message from the JavaScript to the applet. In FIG. 6(B), "ti" represents the name of an applet specified by a "name" attribute of an "applet" tag, and "setStr( )" represents a method held by the applet.

Figure 7:
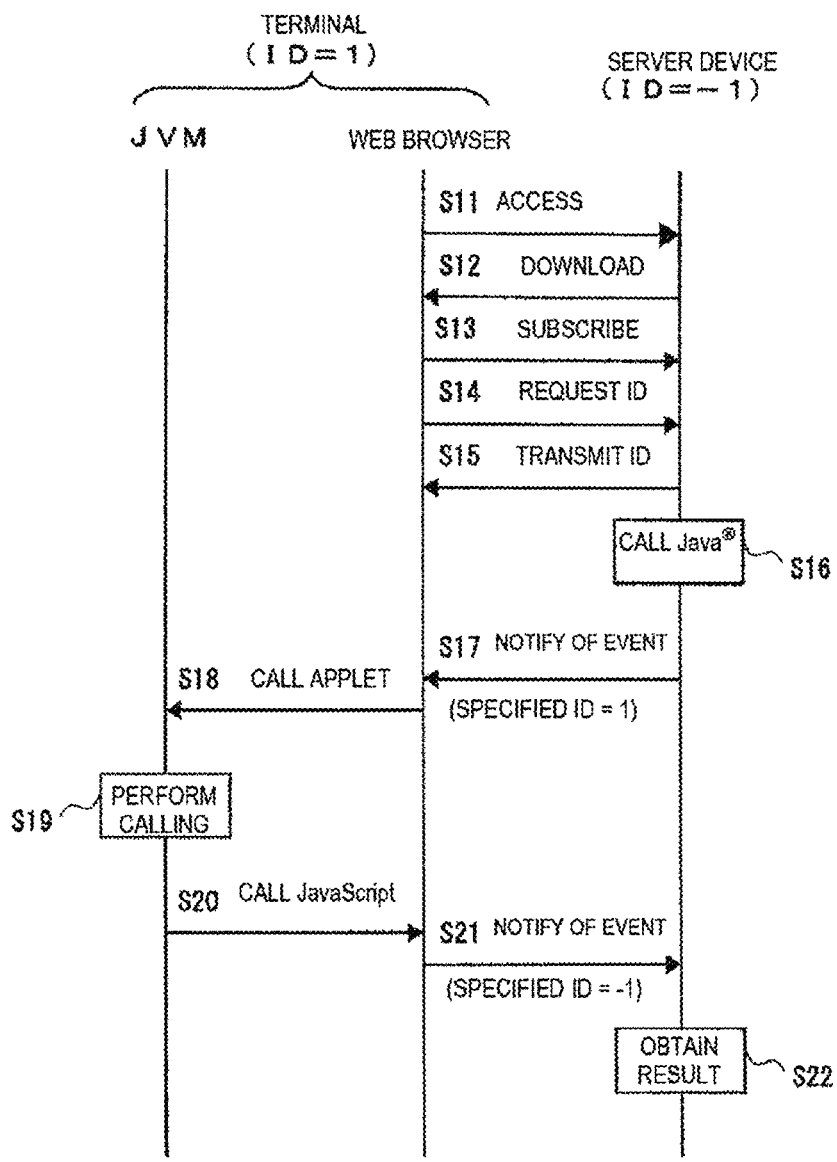
FIG. 7 is a diagram showing an example of the flow of a process for the server device to call a Java method on the terminal according to the embodiment of the present invention

In the following, operations of the server device 20 and the terminal 30 according to this embodiment will be described. FIG. 7 shows an example of the flow of a process for the server device 20 to call a Java method on the terminal 30, in accordance with embodiments of the present invention. First, the web browser 50 on one terminal 30 accesses the URL of an HTML file on the server device 20 (S11). In response to the access, the application transmission section 22 of the server device 20 and the application reception section 51 of the terminal 30 operate to allow the web browser 50 on the terminal 30 to download a web page (S12). The web page includes a JavaScript application and an applet.

Then, the web browser 50 and the JVM 70 of the terminal 30 execute the JavaScript application and the applet included in the downloaded web page, respectively. In this way, the terminal 30 can execute the JavaScript 60 and the applet 80.

Then, the execution section 61 of the JavaScript 60 of the web browser 50 subscribes to the server device 20 (S13). For example, the execution section 61 registers a call-back function called in response to reception of an event. This enables the server device 20 to call the JavaScript 60 of the terminal 30 when the server device 20 receives an event from any of the terminals 30 or an event occurs in the server device 20.

Then, the execution section 61 of the JavaScript 60 of the web browser 50 requests the server device 20 to transmit browser identification information (ID) for identifying the web browser 50 (S14). The execution section 61 can request for the browser identification information simultaneously with the processing of the step S13.

Then, the server device 20 assigns specific browser identification information to the web browser 50 of the terminal 30. In this embodiment, it is assumed that ID=1 is assigned to the web browser 50 of the terminal 30. It is also assumed that the server device 20 is assigned with ID=−1 as identification information. The server device 20 transmits the assigned browser identification information ID=1 to the execution section 61 of the JavaScript 60 of the web browser 50 (S15). The execution section 61 stores the received browser identification information.

On the other hand, the server device 20 executes the servlet 40. It is assumed that the execution section 41 of the servlet 40 calls a Java method on the terminal 30 that has the web browser 50 assigned with ID=1 (S16). It is assumed that the calling process occurs in response to a user's operation on the server device 20 or when the load status of the server device 20 meets a predetermined condition.

Then, the message transmission section 42 of the server device 20 designates the web browser 50 assigned with ID=1 and sends the message 90 to the web browser 50 of an event for calling a Java method (S17); i.e., the message 90 instructs the web browser 50 to have the terminal 30 execute the Java method 96 that is included in the message 90 (see FIG. 4). More specifically, the message transmission section 42 transmits, to the terminal 30, a message including a Java object including a Java method to be executed by the terminal 30 that has the web browser 50 assigned with ID=1. For example, in order to make the terminal 30 execute a Java method for addition, the message transmission section 42 transmits the message 90 having the Java object 90B including the add( ) code shown in FIG. 5 in the Java method 96 in FIG. 4 and the addend in the Java field 97.

When the message reception section 52 of the terminal 30 that has the web browser 50 assigned with ID=1 receives the message, the applet calling section 62 of the terminal 30 hands over an event corresponding to the message from the JavaScript 60 to the applet 80. In other words, the applet calling section 62 calls the execution section 81 of the applet 80 being executed on the JVM 70 of the terminal 30 (S18).

Then, calling for the Java method transmitted from the server device 20 occurs on the applet 80 and the Java method is executed by the applet 18 (S19). In the case where the addition method is to be called, an addition processing is performed by using a resource of the terminal 30.

Then, the JavaScript calling section 82 hands over an event corresponding to the calling of the Java method from the applet 80 to the JavaScript 60. In other words, the JavaScript calling section 82 calls the execution section 61 of the JavaScript 60 being executed on the web browser 50 (S20).

Then, the message transmission section 53 of the terminal 30 designates the server device 20 assigned with ID=−1 and notifies the server device 20 of the event corresponding to the calling of the Java method (S21). More specifically, the message transmission section 53 transmits, to the server device 20, a message including a Java object including a result obtained by calling of the Java method. For example, in the case where the terminal 30 executes the Java method for addition, the message transmission section 53 transmits the message 90' having the Java object 90B including the sum obtained by addition processing in the processing result 99 in FIG. 4.

The server device 20 obtains the result obtained by calling of the Java method by the message reception section 43 of the server device 20 receiving the message (S22). This is the end of the operation of the server device 20 to call the Java method on the terminal 30.

Figure 8:
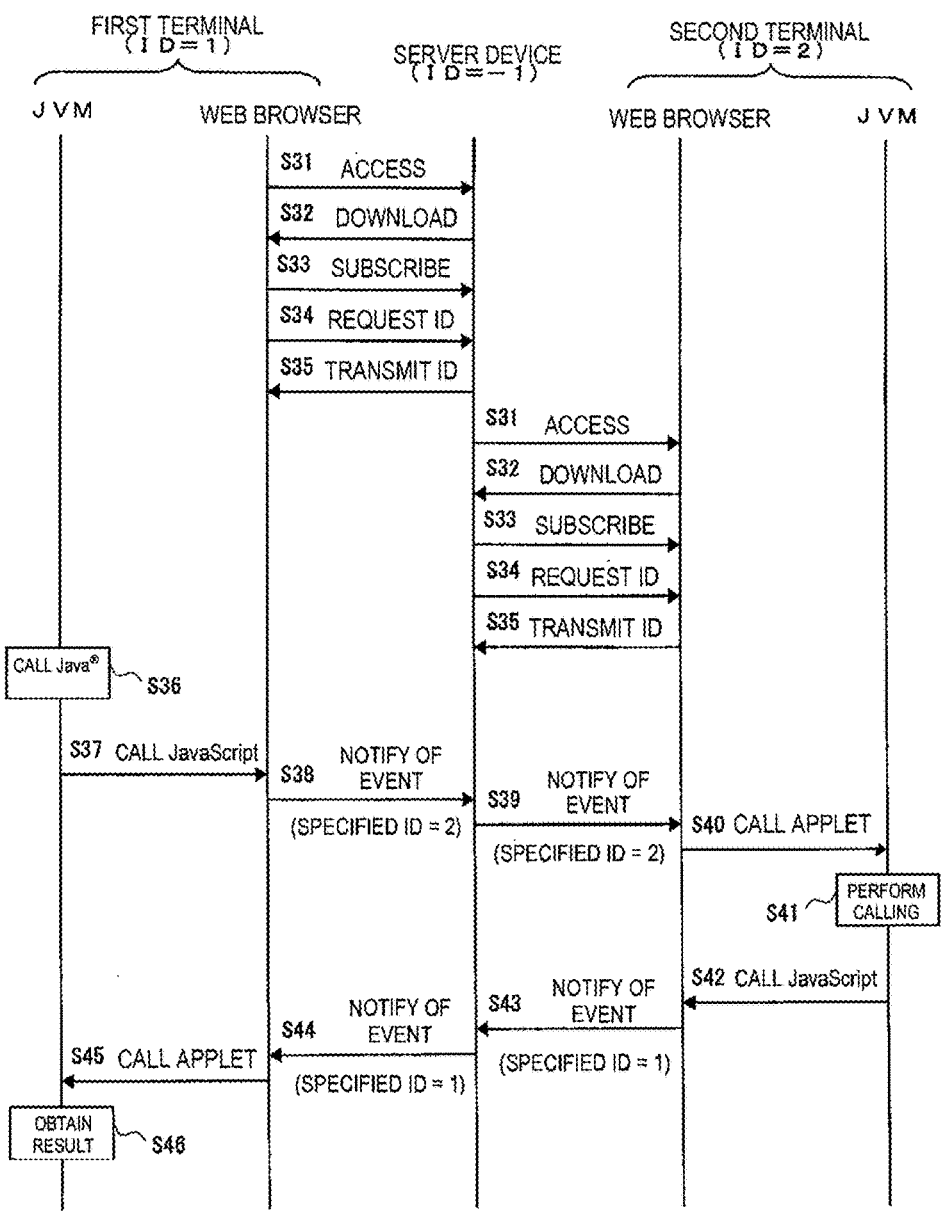
FIG. 8 is a diagram showing an example of the flow of a process for a first terminal to call a Java method on a second terminal according to the embodiment of the present invention, in accordance with embodiments of the present invention.

According to this embodiment, not only the server device 20 but also the terminal 30 can call a Java method on another terminal 30. Next, an operation of a terminal 30 to call a Java method on another terminal 30 will be described. FIG. 8 shows an example of the flow of a process for a first terminal 30 to call a Java method on a second terminal 20, in accordance with embodiments of the present invention.

First, the web browser 50 on the first terminal 30 performs the same steps as steps S11 to S15 in FIG. 7 with the server device 20 (S31 to S35). These steps are the same as those described above and therefore will not be further described. The web browser 50 on the second terminal 30 also performs the same steps as steps S11 to S15 with the server device 20. It is assumed that the web browsers 50 on the first terminal 30 and the second terminal 30 are assigned with ID=1 and ID=2, respectively, as the browser identification information. It is also supposed that the server device 20 is assigned with ID=−1 as the identification information.

It is assumed that the execution section 81 of the applet 80 of the first terminal 30 calls a Java method on the terminal 30 that has the web browser 50 assigned with ID=2 (S36). It is assumed that the calling process occurs in response to a user's operation to the applet 80 being executed on the first terminal 30 or when the load status of the first terminal 30 meets a predetermined condition.

Then, the JavaScript calling section 82 of the first terminal 30 hands over an event for calling a Java method from the applet 80 to the JavaScript 60. In other words, the JavaScript calling section 82 calls the execution section 61 of the JavaScript 60 being executed on the web browser 50 on the first terminal 30 (S37).

Then, the message transmission section 53 of the first terminal 30 designates the web browser 50 assigned with ID=2 and notifies the web browser 50 of the event for calling the Java method (S38). More specifically, the message transmission section 53 transmits, to the server device 20, a message including a Java object including a Java method to be executed by the second terminal 30 that has the web browser 50 assigned with ID=2.

When the message reception section 43 of the server device 20 receives the message, the message transmission section 42 of the server device 20 notifies the second terminal 30 that has the web browser 50 assigned with ID=2 specified in the message of the message (or in other words, transfers the message to the second terminal 30) (S39).

When the message reception section 52 of the second terminal 30 that has the web browser 50 assigned with ID=2 receives the message, the applet calling section 62 of the second terminal 30 hands over an event corresponding to the message from the JavaScript 60 to the applet 80. In other words, the applet calling section 62 calls the execution section 81 of the applet 80 being executed on the JVM 70 of the second terminal 30 (S40).

Then, calling for the Java method transmitted from the first terminal 30 occurs on the applet 80 (S41).

Then, the JavaScript calling section 82 of the second terminal 30 hands over an event corresponding to the calling of the Java method from the applet 80 to the JavaScript 60. In other words, the JavaScript calling section 82 calls the execution section 61 of the JavaScript 60 being executed on the web browser 50 of the second terminal 30 (S42).

Then, the message transmission section 53 of the second terminal 30 designates the web browser 50 assigned with ID=1 and notifies the server device 20 of the event corresponding to the calling of the Java method (S43). More specifically, the message transmission section 53 transmits, to the server device 20, a message including a Java object including a result obtained by calling of the Java method.

When the message reception section 43 of the server device 20 receives the message, the message transmission section 42 notifies the first terminal 30 that has the web browser 50 assigned with ID=1 specified in the message of the message (or in other words, transfers the message to the first terminal 30) (S44).

When the message reception section 52 of the first terminal 30 that has the web browser 50 assigned with ID=1 receives the message, the applet calling section 62 of the first terminal 30 hands over an event corresponding to the message from the JavaScript 60 to the applet 80. In other words, the applet calling section 62 calls the execution section 81 of the applet 80 being executed on the JVM 70 of the first terminal 30 (S45).

In this way, the execution section 81 of the applet 80 of the first terminal 30 obtains the result obtained by calling of the Java method (S46). This is the end of the operation of the first terminal 30 to call the Java method on the second terminal 30.

According to this embodiment, the Java object can be remotely transmitted to the Java program such as the applet being executed by one the terminal 30 (that is, transmitted from outside of the server device 20, another terminal 30 or the like), and the Java method included in the object can be remotely called. That is, a server that does not have an execution environment for the JavaScript can transmit, to a client, the Java program executable on the server as it is rather than the JavaScript program executable only on the client (web browser), and can call and use the program. Thus, the server can obtain the result of a calculation performed by the client using a resource of the client, for example.

In general, in order for a JVM to call a Java method on another JVM, it is necessary to use a Java RMI mechanism. However, according to this embodiment, the Java method can be remotely called even if a module that first accepts a call for an RMI service is not operating in advance on the JVM on which the Java method is called.

Although FIG. 5 illustrates a Java class that performs the four rules of arithmetic, the Java method called on the client is not limited thereto. The Java object transmitted to the client can include any calculation processing. In the following, another example of the Java method called on the client will be described.

First, it can be considered that this embodiment is applied to a sorting calculation. For example, a sorting algorithm is implemented in the Java method, and another method for calling the method is also implemented. Sort target data is included in the Java object in a data format such as an array. Data resulting from the sorting can be written to a sort target area or an area separately prepared. The server can make the client perform the sorting calculation through transmission and reception of the message including the Java object obtained as described above. In general, the amount of calculation required for sorting increases with the number of elements of the sort target data. Therefore the application of this embodiment to make the client perform the calculation processing is advantageous.

It can also be considered that this embodiment is applied to a calculation processing based on the divide-and-conquer approach. The computer system 10 according to this embodiment has a plurality of terminals 30 connected to one server device 20. Therefore, in the sorting calculation, for example, the sort target data can be divided into a plurality of pieces, and a different terminal 30 can be allocated to perform quick sorting or merge sorting for each of the data pieces. The server device 20 can gather the respective results to determine the total sorting result.

It can also be considered that this embodiment is applied to applet status control. In general, the applet has a display area therefore on the web browser on the client, so that the result of processing of the Java object received from the server can be displayed in the display area. In general, a button or the like displayed in the display area has to be operated in order to manipulate an applet. However, according to this embodiment, an applet on the client can be manipulated from the server (or another client) through transmission and reception of the Java object including a command to control display produced by the applet in the display area.

For example, consider an applet that can display an array of buttons such as "Start", "Stop" and "Pause" in the display area on the web browser and enable a user of the client to control a processing through manipulation of these buttons. In addition, it is assumed that the web page displayed on the web browser provides a teaching material used for a remote lecture over a network. In this situation, one lecturer sometimes needs to control a plurality of clients used by a plurality of participants. In order for the lecturer on the server side to control the status of the applet of each client, it is necessary that a method such as "Start", "Stop" and "Pause" is called from the server, and the result is output to the display area for the applet. This application of this embodiment enables such control.

Figure 9:
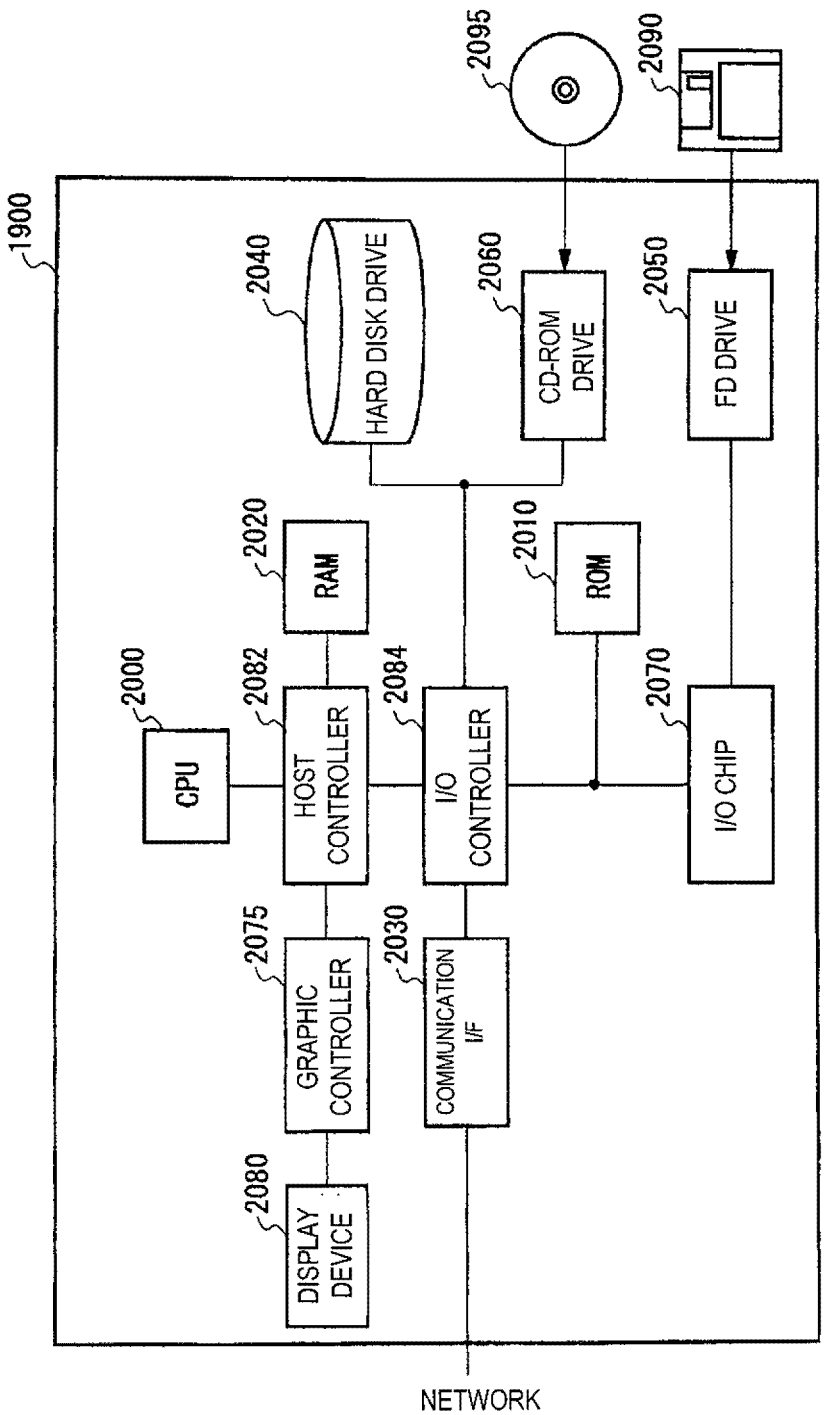
FIG. 9 is a diagram showing an example of the hardware configuration of a computer system in accordance with embodiments of the present invention.

A hardware configuration of the computer according to this embodiment will be described. FIG. 9 shows an example of the hardware configuration of a computer system comprising a computer 1900, in accordance with embodiments of the present invention. The computer 1900 has a CPU periphery section including a CPU 2000, a RAM 2020, a graphic controller 2075 and a display device 2080 connected to each other by a host controller 2082, an input/output section including a communication interface 2030, a hard disk drive 2040 and a CD-ROM drive 2060 connected to the host controller 2082 by an input/output controller 2084, and a legacy input/output section including a ROM 2010, a flexible disk drive 2050 and an input/output chip 2070 connected to the input/output controller 2084.

The host controller 2082 connects the RAM 2020 and the CPU 2000 and the graphic controller 2075 that access the RAM 2020 at high transfer rates to each other. The CPU 2000 operates based on a program stored in the ROM 2010 and the RAM 2020 to control each component. The graphic controller 2075 obtains image data produced on a frame buffer in the RAM 2020 by the CPU 2000 or the like and displays the image on the display device 2080. As an alternative, the graphic controller 2075 may include therein a frame buffer that stores image data produced by the CPU 2000 or the like.

The input/output controller 2084 connects the host controller 2082, the communication interface 2030 that is a relatively fast input/output device, the hard disk drive 2040 and the CD-ROM drive 2060 to each other. The communication interface 2030 communicates with another device over a network. The hard disk drive 2040 stores a program and data used by the CPU 2000 in the computer 1900. The CD-ROM drive 2060 reads a program or data from a CD-ROM 2095 and provides the program or data to the hard disk drive 2040 via the RAM 2020.

To the input/output controller 2084, the ROM 2010, the flexible disk drive 2050 and the input/output chip 2070 that is a relatively slow input/output device are connected. The ROM 2010 stores a boot program executed to activate the computer 1900 and/or a program or the like depending on the hardware of the computer 1900. The flexible disk drive 2050 reads a program or data from a flexible disk 2090 and provides the program or data to the hard disk drive 2040 via the RAM 2020. The input/output chip 2070 not only connects the flexible disk drive 2050 to the input/output controller 2084 but also connects various types of input/output devices to the input/output controller 2084 via a parallel port, a serial port, a keyboard port, a mouse port or the like.

The program provided to the hard disk drive 2040 via the RAM 2020 is stored in a recording medium such as the flexible disk 2090, the CD-ROM 2095 and an IC card and provided by the user. The program is read out of the recording medium, installed into the hard disk drive 2040 in the computer 1900 via the RAM 2020 and executed by the CPU 2000. Thus, a tangible storage device (e.g., hard disk drive 2040) contains program code configured to be executed by the processor (e.g., CPU 2000) via the memory (e.g., RAM 2020) to implement methods of the present invention.

A program downloaded to and executed by the computer 1900 to make the computer 1900 function as the terminal 30 has an application reception module, a message reception module, a message transmission module, a JavaScript execution module, an applet calling module, an applet execution module and a JavaScript calling module. The program or modules act on the CPU 2000 or the like to make the computer 1900 function as each of the application reception section 51, the message reception section 52, the message transmission section 53, the execution section 61, the applet calling section 62, the execution section 81 and the JavaScript calling section 82.

By reading in information processings described in the program, the computer 1900 functions as the application reception section 51, the message reception section 52, the message transmission section 53, the execution section 61, the applet calling section 62, the execution section 81 and the JavaScript calling section 82, which are specific means provided by cooperation of software and the various types of hardware resources described above. These specific means implement a calculation or processing of information appropriate for the use of the computer 1900 according to this embodiment, thereby constructing a specific terminal 30 designed for the use.

A program installed in the computer 1900 to make the computer 1900 function as the server device 20 has an application transmission module, a servlet execution module, a message transmission module and a message reception module. The program or modules act on the CPU 2000 or the like to make the computer 1900 function as each of the application transmission section 22, the execution section 41, the message transmission section 42 and the message reception section 43.

By reading in information processings described in the program, the computer 1900 functions as the application transmission section 22, the execution section 41, the message transmission section 42 and the message reception section 43, which are specific means provided by cooperation of software and the various types of hardware resources described above. These specific means implement a calculation or processing of information appropriate for the use of the computer 1900 according to this embodiment, thereby constructing a specific server device 20 designed for the use.

For example, in the case where the computer 1900 communicates with an external device or the like, the CPU 2000 executes a communication program loaded on the RAM 2020 and instructs the communication interface 2030 to perform a communication processing based on the specific processing described in the communication program. Under the control of the CPU 2000, the communication interface 2030 reads transmission data stored in a transmission buffer region or the like formed in the storage device such as the RAM 2020, the hard disk drive 2040, the flexible disk 2090 or the CD-ROM 2095 and transmits the transmission data to the network, or writes reception data received from the network to a reception buffer region or the like formed in the storage device. In this way, the transmission and reception data can be transferred between the communication interface 2030 and the storage device according to the direct memory access (DMA) scheme. Alternatively, the transmission and reception data may be transferred by the CPU 2000 reading data from the storage device or communication interface 2030 that is the source of the transfer and writing the data to the storage device or communication interface 2030 that is the destination of the transfer.

The CPU 2000 loads the whole or a required part of the file, database or the like stored in the external storage device such as the hard disk drive 2040, the CD-ROM drive 2060 (CD-ROM 2095) and the flexible disk drive 2050 (flexible disk 2090) into the RAM 2020 by DMA transfer or the like and performs various processings on the data in the RAM 2020. Then, the CPU 2000 writes the processed data back to the external storage device by DMA transfer or the like. In such a process, the RAM 2020 can be considered to temporarily retain the content of the external storage device. Therefore, in this embodiment, the RAM 2020, the external storage device and the like are collectively referred to as a memory, a storage section, a storage device or the like. Various types of information according to this embodiment such as various types of programs, data, tables and databases are stored in such a storage device and are subjected to an information processing. The CPU 2000 can temporarily load a part of the content of the RAM 2020 into a cache memory and perform reading and writing on the cache memory. In this case, the cache memory is responsible for a part of the functionality of the RAM 2020. Therefore, in this embodiment, the cache memory is also included in the RAM 2020, the memory and/or the storage device, unless otherwise specified.

The CPU 2000 performs various types of processings specified by an instruction sequence in the program including various types of calculations, information processing, conditional judgment, information searching and replacement described in this embodiment on the data read from the RAM 2020 and writes the processed data back to the RAM 2020. For example, in the case of the conditional judgment, the CPU 2000 determines whether or not each variable described in this embodiment meets a condition such as that it is greater than, smaller than, equal to or greater than or equal to or smaller than another variable or a constant, and branches to a different instruction sequence or calls a subroutine when the condition is met (or not met).

The CPU 2000 can search for information included in a file, database or the like in the storage device. For example, in the case where the storage device stores a plurality of entries the attribute value of a first attribute of which is associated with the attribute value of a second attribute, the CPU 2000 can obtain the attribute value of the second attribute associated with the first attribute that satisfies a predetermined condition by searching the plurality of entries stored in the storage device for an entry the attribute value of the first attribute of which matches with the specified condition and reading the attribute value of the second attribute of the entry.

The programs or modules described above can be stored in an external recording medium. The recording medium may be the flexible disk 2090 or the CD-ROM 2095 or an optical recording medium such as a DVD and a CD, a magneto-optical recording medium such as an MO, a tape medium, or a semiconductor memory such as an IC card, for example. Alternatively, a storage device such as a hard disk or a RAM provided in a server system connected to a dedicated communication network or the Internet may be used as a recording medium, and the program may be provided to the computer 1900 over the network.

Note that the operations, procedures, steps, stages and other processings of the devices, systems, programs and methods described or shown in the claims, specification and drawings can occur in any order unless a particular order is explicitly specified by a word or phrase such as "before" and "in advance", or the result of a processing is used for a subsequent processing. Even if a word such as "first" and "next" is used in the description of the flow of an operation described or shown in the claims, specification or drawings for the sake of convenience, the word does not mean that the operation always occurs in that order.

While the present invention has been described above with regard to an embodiment thereof, the technical scope of the present invention is not limited to the scope of the above description of the embodiment. As will be apparent to those skilled in the art, various modifications and alterations can be made to the embodiment described above. It is apparent from the description of the claims that the technical scope of the present invention can include those modified or altered embodiments.

What is claimed is:

1. A process for implementing a Java method, said process comprising:
   downloading, from a first computer, a web page having embedded therein a JavaScript and a Java applet, said downloading performed by a browser in a second computer, said second computer including a Java Virtual Machine (JVM) communicatively coupled to the browser;
   after said downloading the web page, said JavaScript receiving from a Java servlet executing on the first computer a first message instructing the Java applet to execute the Java method that is included in the first message;
   after said receiving the first message, said Java apples executing the Java method that is in the first message, said executing the Java method comprising said web browser executing the JavaScript which triggers execution of the Java applet by the JVM to cause said executing the Java method by the Java applet; and
   after said executing the Java method, said JavaScript transmitting to the Java servlet a second message that comprises the Java method and a result of said executing the Java method.

2. The process of claim 1, said Java method comprising source code.

3. The process of claim 1, said process comprising:
- after said receiving the first message and before said executing the Java method, said JavaScript transmitting the first message to the Java applet; and
- after said executing the Java method and before said transmitting the second message, transmitting the result of said executing the Java method from the Java applet to the JavaScript.

4. The process of claim 1, said process comprising:
- before said receiving the first message, said JavaScript requesting the first computer to transmit to the web browser a browser identifier for identifying the web browser; and
- after said requesting the browser identifier and before said receiving the first message, said JavaScript receiving the browser identifier from the first computer after the browser identifier had been assigned to the web browser by the first computer.

5. The process of claim 1, wherein the first message comprises a name of the Java method and data for the Java method, and wherein the Java method, the name of the Java method, and the data for the Java method are in different fields of the first message.

6. The process of claim 1, wherein the JavaScript cannot be executed by the first computer.

7. The process of claim 1, wherein the Java method is stored in the first computer, and wherein the first computer is configured to execute the Java method.

8. A computer program product, comprising a computer readable storage device having computer readable program code stored therein, said program code configured to be executed by a second computer to implement a process for implementing a Java method, said process comprising:
- downloading, from a first computer, a web page having embedded therein a JavaScript and a Java applet, said downloading performed by a browser in the second computer, said second computer including a Java Virtual Machine (JVM) communicatively coupled to the browser;
- after said downloading the web page, said JavaScript receiving from a Java servlet executing on the first computer a first message instructing the Java applet to execute the Java method that is included in the first message;
- after said receiving the first message, said Java applet executing the Java method that is in the first message, said executing the Java method comprising said web browser executing the JavaScript which triggers execution of the Java applet by the JVM to cause said executing the Java method by the Java applet; and
- after said executing the Java method, said JavaScript transmitting to the Java servlet a second message that comprises the Java method and a result of said executing the Java method.

9. The computer program product of claim 8, said Java method comprising source code.

10. The computer program product of claim 8, said process comprising:
- after said receiving the first message and before said executing the Java method, said JavaScript transmitting the first message to the Java applet; and
- after said executing the Java method and before said transmitting the second message, transmitting the result of said executing the Java method from the Java applet to the JavaScript.

11. The computer program product of claim 8, said process comprising:
- before said receiving the first message, said JavaScript requesting the first computer to transmit to the web browser a browser identifier for identifying the web browser; and
- after said requesting the browser identifier and before said receiving the first message, said JavaScript receiving the browser identifier from the first computer after the browser identifier had been assigned to the web browser by the first computer.

12. The computer program product of claim 8, wherein the first message comprises a name of the Java method and data for the Java method, and wherein the Java method, the name of the Java method, and the data for the Java method are in different fields of the first message.

13. The computer program product of claim 8, wherein the JavaScript cannot be executed by the first computer.

14. The computer program product of claim 8, wherein the Java method is stored in the first computer, and wherein the first computer is configured to execute the Java method.

15. A computer system comprising a second computer having a processor, a memory, and a computer readable storage device, said storage device containing program code configured to be executed by the processor via the memory to implement a process for implementing a Java method, said process comprising:
- downloading, from a first computer, a web page having embedded therein a JavaScript and a Java applet, said downloading performed by a browser in the second computer, said second computer including a Java Virtual Machine (JVM) communicatively coupled to the browser;
- after said downloading the web page, said JavaScript receiving from a Java servlet executing on the first computer a first message instructing the Java applet to execute the Java method that is included in the first message;
- after said receiving the first message, said Java applet executing the Java method that is in the first message, said executing the Java method comprising said web browser executing the JavaScript which triggers execution of the Java applet by the JVM to cause said executing the Java method by the Java applet; and
- after said executing the Java method, said JavaScript transmitting to the Java servlet a second message that comprises the Java method and a result of said executing the Java method.

16. The computer system of claim 15, said Java method comprising source code.

17. The computer system of claim 15, said process comprising:
- after said receiving the first message and before said executing the Java method, said JavaScript transmitting the first message to the Java applet; and
- after said executing the Java method and before said transmitting the second message, transmitting the result of said executing the Java method from the Java applet to the JavaScript.

18. The computer system of claim 15, said process comprising:
- before said receiving the first message, said JavaScript requesting the first computer to transmit to the web browser a browser identifier for identifying the web browser; and
- after said requesting the browser identifier and before said receiving the first message, said JavaScript receiving the browser identifier from the first computer after the browser identifier had been assigned to the web browser by the first computer.

19. The computer system of claim 15, wherein the first message comprises a name of the Java method and data for the Java method, and wherein the Java method, the name of the Java method, and the data for the Java method are in different fields of the first message.

20. The computer system of claim 15, wherein the JavaScript cannot be executed by the first computer.

* * * * *